United States Patent [19]

Yokoyama et al.

[11] Patent Number: 4,699,852
[45] Date of Patent: Oct. 13, 1987

[54] FUEL BATTERY

[75] Inventors: Jiro Yokoyama; Seiichi Tanabe, both of Tokyo, Japan

[73] Assignee: Mitsubishi Jukogyo Kabushiki Kaisha, Japan

[21] Appl. No.: 899,110

[22] Filed: Aug. 22, 1986

[30] Foreign Application Priority Data

Aug. 22, 1985 [JP] Japan ................................ 60-184961

[51] Int. Cl.$^4$ ............................................. H01M 8/10
[52] U.S. Cl. ........................................ 429/31; 429/40
[58] Field of Search ................. 429/31, 209, 218, 221, 429/149, 160, 104, 61, 122, 27, 12

[56] References Cited

U.S. PATENT DOCUMENTS

| | | | |
|---|---|---|---|
| 737,285 | 8/1903 | Schoenmehl | 429/209 |
| 3,460,991 | 8/1969 | White | 429/40 |
| 4,547,437 | 10/1985 | Isenberg et al. | 429/31 |

Primary Examiner—Donald L. Walton
Attorney, Agent, or Firm—Birch, Stewart, Kolasch & Birch

[57] ABSTRACT

The present application provides a fuel battery by which a loss due to electric resistance in a cathode, an electrolyte and an anode is decreased and which comprises a plurality of unit fuel cells each having the cylindrical anode, the cylindrical solid electrolyte in contact with the anode and the cylindrical cathode in contact with the cylindrical solid electrolyte, with the plurality of unit fuel cells being connected to each other with the interposition of connectors, the fuel battery being characterized in that the thickness of the anode is smaller with distance from the portion thereof connected to the cathode of the adjacent fuel cell, and the thickness of the cathode is smaller with distance from the portion thereof connected to the anode of the other adjacent fuel cell.

7 Claims, 10 Drawing Figures

FUEL BATTERY

BACKGROUND OF THE INVENTION

(1) Field of the Invention

The present invention relates to a fuel battery, particularly to a cylindrical solid electrolyte type fuel battery. The fuel battery can be defined as a battery in which an oxidative reaction is electrochemically carried out, and free energy change attendant on this oxidative reaction is taken out from a cathode and an anode as electrical energy directly.

(2) Description of the Prior Art

As well known, the ionic conductivity of the electrolyte in a high-temperature solid electrolyte type fuel battery is much lower, as compared with that of an alkali type, a phosphoric type or a molten carbonate type fuel battery. In order to assure the performance of the fuel battery, therefore, it is essential to render an electrolytic membrane thin, and at present, its thickness is within the range of 10 to 500 $\mu$m.

As a material for electrodes, an Ni base material is selected in view of conditions such as electrolytes, an operating gas and the like, but the electrodes made from such a material have large electric resistance. In consequence, it is also desired to develop the electrodes comprising a thin layer.

The fuel battery is still on the way to development, but for the above mentioned reasons, the most of the conventional fuel batteries have structures shown in FIGS. 3 to 5. That is, as seen in FIG. 3, in many cases, an anode 2, an electrolyte 3 and a cathode 4, each of which is made from the thin layer having a thickness of about 300 $\mu$m or less, are formed on a cylindrical porous support pipe 1. In FIG. 4 in which a circular portion A in FIG. 3 is enlargedly shown, reference numerals 5a and 5b represent intermediate connectors, and numeral 6 is a connecting member.

The structure of another fuel battery by conventional technique is illustrated in FIGS. 6 and 7. With regard to this technique, the anode 2 and the cathode 4 are disposed inversely, but they basically have the same structure as in the fuel battery shown in FIG. 5. In FIG. 6, widths represented by reference symbols L1 and L2 are 0.1 cm and 0.5 cm, respectively. In FIG. 7, reference numeral 7 is a (solid) electrolyte, numeral 8 is a gap between fuel electrodes, 9 is an intermediate connector, and 10 is a gap (0.1 cm) between air electrodes.

The voltage of each unit cell in such a fuel battery is within the range of 0.6 to 1.0 volt. For the purpose of obtaining a high voltage, the unit cells should be connected in series by the use of the intermediate connectors 5a, 5b (or 9) and, in a certain case, connecting members. Further, a large current can be obtained by connecting the sets of unit cells in parallel which have been connected in series.

The performance of the fuel battery depends on an output voltage, and one example of the relation between the latter and an output current is shown in FIG. 8. This drawing indicates that when the output current is increased, a loss will increase and the performance will deteriorate.

The loss content can be classified into various components such as entropy change loss, cathode activating energy loss, anode activating energy loss, electric resistance loss and ion mobile resistance loss. Which loss is greater in a fuel battery depends on the kind of fuel battery and its usable range.

In the high-temperature solid electrolyte type fuel battery, the entropy change loss, the electric resistance loss and the ion mobile resistance loss are larger.

The entropy change loss is greatly dependant on an operating temperature, and thus the decrease in the entropy change loss cannot be desired. Inversely, the entropy change loss is not always considered to be a drawback, because a high-temperature exhaust gas from the fuel battery can lead to the improvement of efficiency in a bottoming cycle.

Therefore, in the high-temperature solid electrolyte type fuel battery, the point to be improved is that the resistance loss attendant on the migration of electricity (electrons) and ions (0—) is great.

This large resistance loss would be due to the following two causes: The first cause is that a specific resistance of the material itself is high, and the second cause is that a current density is not uniform and an effective sectional area of a current channel is decreased by the flow of concentrated current in a particular region, which lead the resistance loss on the whole to increase.

In connection with the phosphoric type and the molten carbonate type fuel batteries which are thought to be put into practice in the near future, the ununiformed current density results from the gas stream. Accordingly, the uniformization of the current density can be achieved by controlling the gas stream.

On the contrary, in the case of the high-temperature solid electrolyte type fuel battery which is different therefrom in the concept of a laminate structure because of having a cylindrical shape, the ununiformed current density will occur, even if the gas stream is controlled well.

FIG. 9 shows current densities in the cathode and the anode of the fuel battery shown in FIG. 5. For convenience, a certain position in the cathode or the anode will be represented hereinafter by an angle. For example, in FIG. 3, a vertical line (not shown) extending through the center of the intermediate connector from the center of the cylindrical cell is regarded as a base line (i.e., 0 or 360 degrees), and the certain position in the cathode or the anode will be represented by an angle between this base line and a line extending through the above certain position in the electrode from the center of the cell. In this way, the angle which is an abscissa axis in FIG. 9 represents the certain position in the electrode. In this drawing, a curve A denotes the current density of the cathode (fuel electrode) and a curve B denotes that of the anode (air electrode).

Since the anode 2 is connected to a connecting piece 6 at a position of 0 degree with the interposition of the intermediate connectors (output terminals on the side of the anode) 5a, 5b, all the current which flows through the fuel battery passes through these portions. The current which has flowed through the anode 2 migrates to the cathode through an electrolyte, therefore the current density in the anode 2 becomes lower with distance from the connecting piece 6. That is, the current density in the anode 2 is maximum at 0 degree and minimum at 180 degrees therein.

Since the cathode 4 is connected to the connecting piece (an output terminal on the side of the cathode) 6 at a position of 180 degrees, all the current which flows through the fuel battery passes through the portion of the cathode 4 which is in contact with the connecting piece 6. On the contrary, the current which passes through other portions of the cathode 4 is only a part of the current which flows through the fuel battery. Therefore, in the cathode 4, the current density is maximum at 180 degrees and is minimum in the vicinity of 0 degree.

FIG. 10 shows a current density distribution in the anode of the fuel battery shown in FIG. 7. In FIG. 10, the length of the unit cell in an axial direction is normalized, to one. In this drawing, 0 and 1 denote the direction of the cathode (fuel electrode) and the direction of the anode (air electrode), respectively. A parameter is the number of cells per stack, i.e., the number of the cells per unit length of the battery.

The results in FIG. 10 indicate that the more the number of the cells per stack is, the more uniform the current density is.

SUMMARY OF THE INVENTION

An object of the present invention is to provide an improved cylindrical type fuel battery in which a current density is homogenized to obtain a higher performance than in a conventional battery.

The above mentioned problems can be solved according to the present invention: a fuel battery which comprises a plurality of unit fuel cells each having a cylindrical anode, a cylindrical solid electrolyte in contact with the anode and a cylindrical cathode in contact with the cylindrical solid electrolyte, with the plurality of unit fuel cells being connected to each other with the interposition of connectors, the fuel battery being characterized in that the thickness of the anode is smaller with distance from the portion thereof connected to the cathode of the adjacent fuel cell, and the thickness of the cathode is smaller with distance from the portion thereof connected to the anode of the other adjacent fuel cell.

The voltage drop $\Delta V$ of the output voltage due to the internal resistance $R_{IN}$ of the fuel battery can be represented by the following formula:

$$\Delta V = I \times R_{IN}$$

where I is an output current.

The current path in a fuel battery depends on the shape of the fuel battery itself and is generally intricate. When the unit fuel battery is divided along the current path into n fine pieces each having a unit sectional area, the voltage drop $\Delta V$ can be represented by the following formula:

$$\Delta V = I_1 \times (R_{A1} + R_{E1} + R_{C1}) \quad (1)$$
$$= I_2 \times (R_{A2} + R_{E2} + R_{C2})$$
$$\vdots$$
$$= I_n \times (R_{An} + R_{En} + R_{Cn})$$

where each of $I_1, I_2, \ldots I_n$ is the current which flows through each path.

Where $i = 1, 2, \ldots$ or n, $R_{Ai}$ is a resistance in the cathode in the i-th path, $R_{Ei}$ is a resistance in the electrolyte in the i-th path, and $R_{Ci}$ is a resistance in the anode in the i-th path.

The output current I of the fuel battery is the sum of the currents in the respective paths routes and thus it can be represented by the following formula (2):

$$I = \sum_{i=1}^{n} I_i \quad (2)$$

If electrical resistances per unit length of the cathode, the electrolyte and the anode each having the unit sectional area are represented by $\rho_A$, $\rho_E$ and $\rho_C$, the following formulae stand:

$$R_{Ai} = \rho_A \times \delta_{Ai} \quad (3)$$
$$R_{Ei} = \rho_E \times \delta_{Ei}$$
$$R_{Ci} = \rho_C \times \rho_{Ci}$$

where $\delta_{Ai}$ is a length of the i-th path in the positive electrode, $\delta_{Ei}$ is a length of the i-th path in the electrolyte, and $\rho_{Ci}$ is a length of the i-th path in the anode.

The best sectional shape is that $\Delta V$ is minimum under the condition of output current I being constant. This sectional shape can be obtained in accordance with a variation calculus by changing the sectional shape. That is, having the minimum value, $\Delta V$ does not change, even if the sectional shape is slightly altered. Accordingly, in the desired sectional shape, a variation $d\Delta V$ of $\Delta V$ to the change in the sectional shape is zero:

$$d\Delta V = 0$$

This question of the variation is very intricate and it is difficult to obtain a exact solution. However, a qualitative solution can be acquired in accordance with the following model.

An equivalent circuit having electric resistances Ri connected in parallel is supposed for the current path in the fuel battery. Then, the following relations can be set up:

$$R_i = R_{Ai} + R_{Ei} + R_{Ci} (i = 1, \ldots \text{ or } n)$$
$$\Delta V = R_i I_i (i = 1, \ldots \text{ or } n)$$
$$I = \Sigma I_i (i = 1, \ldots \text{ or } n)$$

Further, when a volume of the fuel battery is constant, the following relation can be supposed from brief consideration.

$$R = \Sigma R_i (i = 1, \ldots \text{ or } n)$$

The problem can be solved by determining the minimal of $\Delta V$ by changing $R_i$ under the condition that I and R are maintained constant.

The variation $d\Delta V$ of $\Delta V$ by the variation $dR_i$ of $R_i$ by changing the shape of the fuel battery is represented by the following formula:

$$d\Delta V = R_i dI_i + I_i dR_i$$

Since dV is minimum, the relation of $d\Delta V = 0$ can be set up.

$$0 = R_i dI_i + I_i dR_i$$

Thus, $$dI_i = (-I_i/R_i)dR_i$$

From the calculation of the variations of $I = \Sigma I_i$ and $R = \Sigma R_i$, the following relation can be set up, owing to I and R being constants:

$$0 = \Sigma dI_i = \Sigma(-I_i/R_i)dR_i$$

$$0 = \Sigma dI_i$$

In order to set up the above two formulae without regard to $dR_i$, both the formulae must be equivalent. The condition for this is $(-I_i/R_i) = K$, where K is a constant.

This result can be summarized as follows:

In the case that the resistance $R_i$ (i = 1, ... or n) is connected in parallel and when $R_i$ is varied under the condition of $\Sigma R_i = R$ (constant), $\Delta V$ will be minimum, if the current $I_i$ is proportional to the resistance $R_i$.

This result can be applied to the cylindrical type fuel battery.

The current in the anode decreases with the distance from the portion thereof connected to the output terminal, and the current in the cathode decreases with the distance from the portion thereof connected to the output terminal on the side of the cathode. Therefore, by reducing the thickness of the thin layer of the anode with the distance from the output terminal on the side of the anode, and by reducing the thickness of the thin layer of the cathode with the distance from the output terminal on the side of the cathode, $\Delta V$ can be minimized.

DESCRIPTION OF THE PREFERRED EMBODIMENTS

Figure 1:
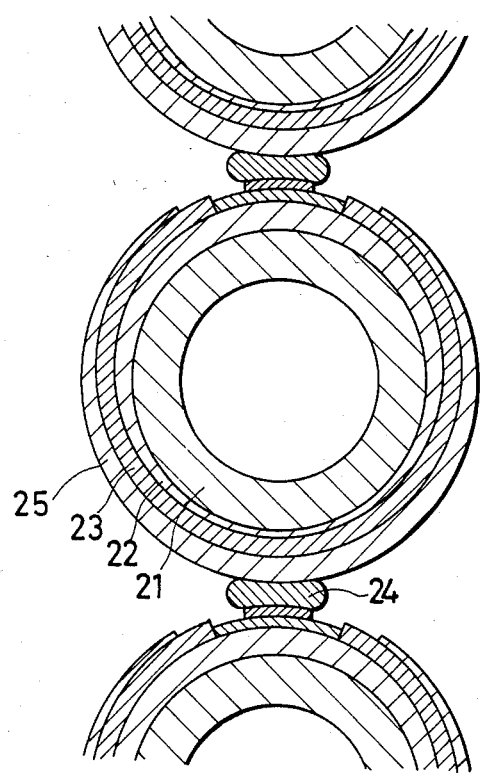
FIG. 1 is a partial and sectional view of a preferable embodiment according to the present invention.
Figure 3:
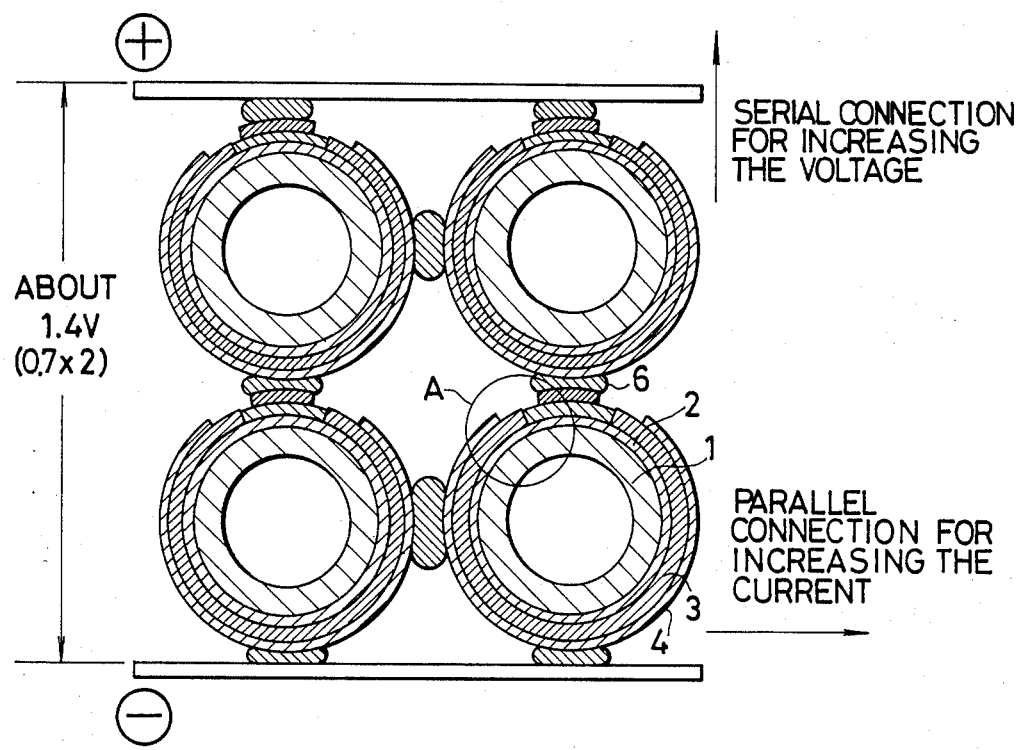
FIG. 3 is a sectional view of a cylindrical fuel battery according to a conventional technique.
Figure 4:
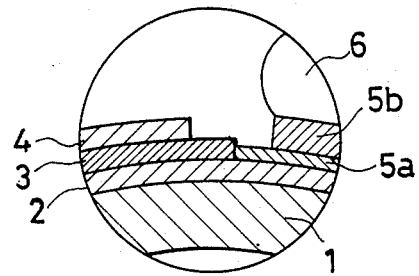
FIG. 4 is an enlarged view of a part in FIG. 3.
Figure 5:
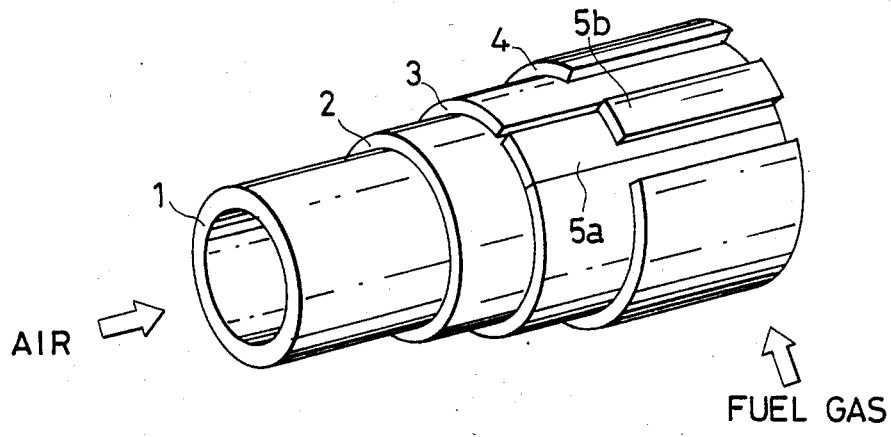
FIG. 5 is a perspective view of the fuel battery in FIG. 3.

FIG. 1 shows a cylindrical solid electrolyte type fuel battery according to the present invention in which a conventional cylindrical solid electrolyte type fuel battery in FIGS. 3 to 5 is improved.

In FIG. 1, reference numeral 21 is a porous support pipe. Around this pipe 21, there is disposed an anode (air electrode) 22 which is thickened on the side of an intermediate connector thereof. Around this anode 22, there is disposed a cathode (fuel electrode) 25 with the interposition of an electrolyte 23, the cathode being thickened on the side contacting with a connecting piece 24. The above mentioned porous support pipe 21 and the cathode 25 are concentric circles.

In forming the above structure, the porous support pipe 21 and the cathode 25 are first constructed in the form of concentric circles, and then the center of the outer periphery (the inner periphery of the electrolyte 23) of the anode 22 is positioned so as to be upward eccentric. Next, in order to uniformize the thickness of the electrolyte 23, the outer periphery of the electrolyte 23 (the inner periphery of the cathode 25) is similarly eccentrically constituted. That is, the outer periphery of the anode and the outer periphery of the electrolyte make concentric circles. Afterward, the outer periphery of the cathode 25 which is not eccentric as described above is formed with a thin layer thereon. Therefore, the thickness of the cathode 25 corresponds to the current density.

Since the anode 22 is thickened on the side of the intermediate connector and the cathode 25 is thickly constituted on the side thereof contacting with the connecting piece 24, the sectional area of a current path is varied in compliance with a flow rate of the current in its flow direction. Therefore, a current density can be uniformized more, as compared with the conventional technique, and the performance (operating voltage) of the battery can be noticeably improved. In addition to this effect, the efficiency of a fuel battery power generation plant which is combined with a bottoming cycle can be improved remarkably.

The sections of the anode and the cathode are circular in the above description, but they are not limited thereto. Other exemplary sections of the electrodes include combinations of a round half circle and an elliptic half circle, a parabolic half circle and an elliptic half circle, and a round half circle and a parabolic half circle.

In the above description, the thickness of the porous support pipe and the electrolyte is constant, but it is not limited thereto and may be changed suitably.

Figure 2:
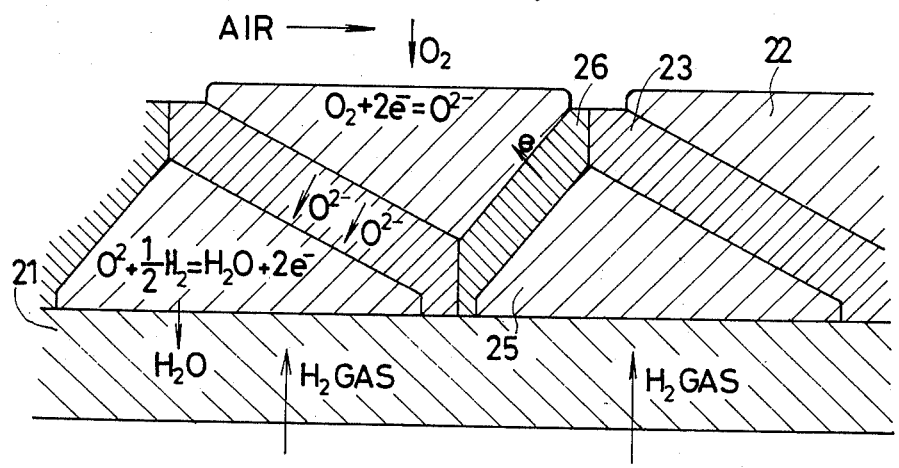
FIG. 2 is a partial and sectional view of another preferable embodiment according to the present invention.
Figure 6:
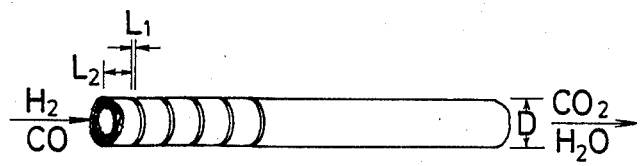
FIG. 6 is a perspective view of the cylindrical fuel battery according to regarding the conventional technique.
Figure 7:
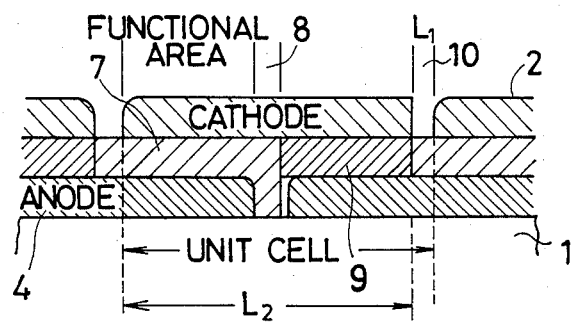
FIG. 7 is a sectional view taken along an axial direction of the fuel battery shown in FIG. 6.
Figure 8:
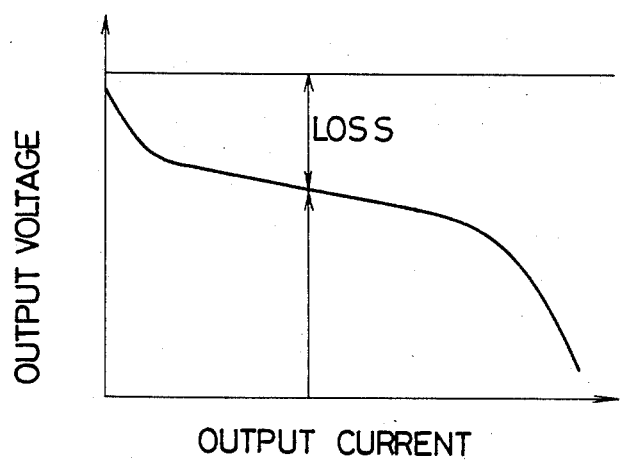
FIG. 8 is a characteristic curve showing the relation between output current and output voltage of the fuel battery.
Figure 9:
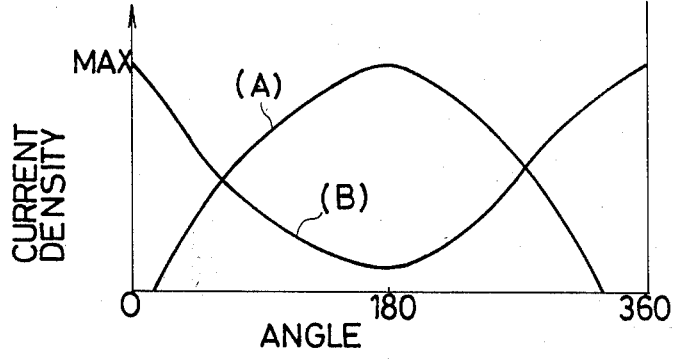
FIG. 9 shows the distribution of current density in a cathode (A) and an anode (B) of the fuel battery according to the conventional technique.
Figure 10:
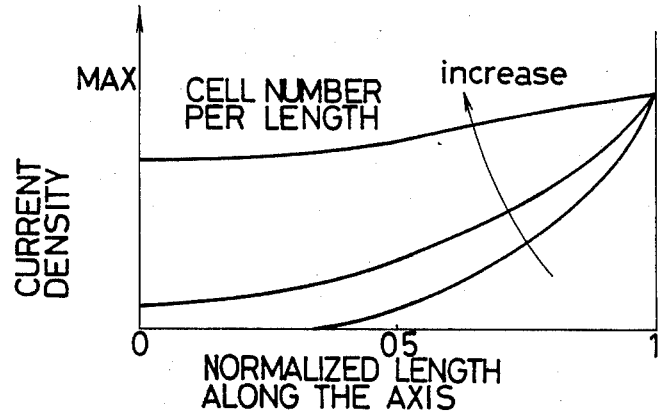
FIG. 10 shows the current density distribution of the fuel battery according to the conventional technique in FIGS. 6 and 7.

FIG. 2 shows another cylindrical solid electrolyte type fuel-battery according to the present invention in which such a conventional fuel battery as in FIGS. 6 and 7 is improved.

The numerals in FIG. 2 represent the same corresponding members in FIG. 1, and thus their explanation is omitted. In the embodiment shown in FIG. 2, the electrolyte 23 and an intermediate connector 26 are identical in thickness as in the conventional technique, but the anode 22 and the cathode 25 are constituted so that the thickness thereof may vary along their axial direction. In this case, for example, the anode 22 and the cathode 25 both may have the sectional shape of a pentagon.

In this embodiment, the sectional shape of the anode and the cathode is of the pentagon, but it is not limited thereto. For example, their sectional shape may be a triangle; a portion of the sectional shape may be circular, hyperbolic, parabolic or elliptic; or a combination thereof may be acceptable.

In the above description, the thickness of the electrolyte and the intermediate connector is constant, but it is not limited thereto and may be changed suitably.

According to the present invention just described in detail, the fuel battery can be provided in which the current density is uniformized more than the conventional case in order to improve its performance.

What is claimed is:

1. A fuel battery which comprises a plurality of unit fuel cells each having a cylindrical anode, a cylindrical solid electrolyte in contact with said anode and a cylindrical cathode in contact with said cylindrical solid electrolyte, with said plurality of unit fuel cells being connected with each other with the interposition of connectors, said fuel battery being characterized in that the thickness of said anode is smaller with distance from the portion thereof connected to said cathode of said adjacent fuel cell, and the thickness of said cathode is smaller with distance from the portion thereof connected to said anode of said other adjacent fuel cell.

2. A fuel battery according to claim 1 wherein said unit fuel cell, said adjacent unit fuel cell connected to said anode of said unit fuel cell and said other adjacent unit fuel cell connected to said cathode of said unit fuel cell are formed on cylindrical porous support pipes disposed in parallel.

3. A fuel battery according to claim 2 wherein said cylindrical anode is formed on the outer periphery of said cylindrical porous support pipe; said cylindrical solid electrolyte is formed, contacting with said anode, on the outer periphery of said anode; said cylindrical cathode is formed, contacting with said electrolyte, on the outer periphery of said electrolyte; said outer peripheries of said cylindrical porous support pipe and said cathode are concentric circles; the outer peripheral circle of said anode is a circle which is eccentric to the outer peripheral circle of said support pipe; and said outer peripheries of said electrolyte and said anode are concentric circles.

4. A fuel battery according to claim 1 wherein said unit fuel cell, said adjacent unit fuel cell connected to said cylindrical anode of said unit fuel cell and said other adjacent unit fuel cell connected to said cylindrical cathode of said unit fuel cell are formed on the same cylindrical porous support pipe.

5. A fuel battery according to claim 4 wherein said cylindrical cathode is formed away from said cylindrical cathode of said adjacent unit fuel cell; said cylindrical solid electrolyte is formed covering a portion of the outer surface of said cylindrical cathode; said anode is formed in contact with the outer surface of said electrolyte and away from said anode of said adjacent unit fuel cell; and said anode is connected to said cathode of said adjacent unit fuel cell at the portion which is not covered with said electrolyte, with the interposition of a connector.

6. A fuel battery according to claim 5 wherein the thickness of said cylindrical cathode is altered along its axial direction so as to be larger at the central portion thereof and to be smaller at the opposite ends thereof; the thickness of said cylindrical anode is altered along its axial direction so as to be larger at the central portion thereof and to be smaller at the opposite ends thereof; the thickest portion of said cathode is positioned in a space between said anodes; and the thickest portion of said anode is positioned in a space between said cathodes.

7. A fuel battery according to claim 6 wherein a sectional shape of said cathode and said anode is pentagonal.

* * * * *